US012431313B2

(12) United States Patent
Yoneda

(10) Patent No.: US 12,431,313 B2
(45) Date of Patent: Sep. 30, 2025

(54) PROTECTION ELEMENT

(71) Applicant: DEXERIALS CORPORATION, Tochigi (JP)

(72) Inventor: Yoshihiro Yoneda, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 217 days.

(21) Appl. No.: 17/597,719

(22) PCT Filed: Jul. 1, 2020

(86) PCT No.: PCT/JP2020/025818
§ 371 (c)(1),
(2) Date: Jan. 19, 2022

(87) PCT Pub. No.: WO2021/014909
PCT Pub. Date: Jan. 28, 2021

(65) Prior Publication Data

US 2022/0319792 A1 Oct. 6, 2022

(30) Foreign Application Priority Data

Jul. 24, 2019 (JP) ................................ 2019-136245

(51) Int. Cl.
*H01H 85/055* (2006.01)
*H01H 85/00* (2006.01)
(Continued)

(52) U.S. Cl.
CPC ...... *H01H 85/055* (2013.01); *H01H 85/0047* (2013.01); *H01H 85/165* (2013.01); *H01H 85/38* (2013.01); *H01H 2085/383* (2013.01)

(58) Field of Classification Search
CPC ............ H01H 85/055; H01H 85/0047; H01H 85/165; H01H 85/38; H01H 2085/383;
(Continued)

(56) References Cited

U.S. PATENT DOCUMENTS 3,287,524 A * 11/1966 Huber .................... H01H 85/38 337/159
4,417,226 A * 11/1983 Asdollahi ............ H01H 85/165 337/279
(Continued)

FOREIGN PATENT DOCUMENTS

CN 105051855 11/2015
CN 107112172 8/2017
(Continued)

OTHER PUBLICATIONS

Hayashi Akihiro, "Terminal Fitting", May 23, 2015, Auto Network Gijutsu Kenkyusho; Sumitomo Wiring System; Sumitomo Electric Industries, Entire Document (Translation of JP 2013101801) (of record, cited in the IDS, including Original Document). (Year: 2013).*

(Continued)

*Primary Examiner* — Stephen S Sul
(74) *Attorney, Agent, or Firm* — Schwegman Lundberg & Woessner, P.A.

(57) ABSTRACT

This protection element (100) has a fuse element (3), an insulating inorganic fibrous material (4) that is disposed in contact with or close to at least a part of the fuse element (3), and a case member (5) configured to enclose a part of the fuse element (3) and the insulating inorganic fibrous material (4).

10 Claims, 10 Drawing Sheets

(51) Int. Cl.
*H01H 85/165* (2006.01)
*H01H 85/38* (2006.01)

(58) Field of Classification Search
CPC .. H01H 85/10; H01H 85/11; H01H 2085/388; H01H 85/18; H01H 37/76; H01H 85/06; H01H 85/08; H01H 85/17
See application file for complete search history.

(56) References Cited

U.S. PATENT DOCUMENTS

| | | | | | |
|---|---|---|---|---|---|
| 4,709,222 | A * | 11/1987 | Morita | H01H 85/18 337/276 |
| 5,179,436 | A * | 1/1993 | Asdollahi | H01H 85/0417 337/203 |
| 5,357,234 | A * | 10/1994 | Pimpis | H01H 85/165 337/252 |
| 5,736,918 | A * | 4/1998 | Douglass | H01H 85/18 337/248 |
| 5,854,583 | A * | 12/1998 | Falchetti | H01H 85/1755 337/159 |
| 6,075,429 | A * | 6/2000 | Uotome | H01H 9/443 335/130 |
| 6,577,222 | B1 * | 6/2003 | Krueger | H01H 85/17 337/228 |
| 10,388,482 | B2 * | 8/2019 | Siegwald | H01H 85/055 |
| 11,183,353 | B2 * | 11/2021 | Fan | H01H 85/203 |
| 11,393,651 | B2 * | 7/2022 | Neyens | H01H 85/47 |
| 11,482,393 | B2 * | 10/2022 | Chen | H01H 85/17 |
| 2003/0055160 | A1 * | 3/2003 | Yamazaki | C08L 77/02 524/606 |
| 2004/0132921 | A1 * | 7/2004 | Fujimoto | H01H 85/17 525/418 |
| 2005/0258928 | A1 * | 11/2005 | Hase | H01H 37/74 337/159 |
| 2009/0315664 | A1 * | 12/2009 | Crane | H01H 9/44 337/227 |
| 2013/0293341 | A1 * | 11/2013 | Krause | H01H 85/47 337/187 |
| 2015/0371803 | A1 * | 12/2015 | Hosomizo | H01H 85/12 337/142 |
| 2016/0013001 | A1 | 1/2016 | Yoneda et al. | |
| 2020/0006030 | A1 * | 1/2020 | Yoneda | H01H 85/06 |
| 2020/0066473 | A1 * | 2/2020 | Samuels | H01H 85/38 |

FOREIGN PATENT DOCUMENTS

| | | | |
|---|---|---|---|
| CN | 107735849 | | 2/2018 |
| JP | 5740244 | | 3/1982 |
| JP | 05274994 | A | 10/1993 |
| JP | 2000076971 | | 3/2000 |
| JP | 4192266 | B2 | 12/2008 |
| JP | 2009510708 | A | 3/2009 |
| JP | 2010129172 | A | 6/2010 |
| JP | 2013101801 | A | 5/2013 |
| JP | 2014220184 | A | 11/2014 |
| JP | 3196848 | U | 3/2015 |
| JP | 2016071972 | A | 5/2016 |
| JP | 2016095898 | A | 5/2016 |
| JP | 6249600 | B2 | 12/2017 |
| JP | 6249602 | B2 | 12/2017 |
| JP | 6436729 | B2 | 11/2018 |
| JP | 6527323 | B2 | 5/2019 |
| TW | 201528306 | | 7/2015 |

OTHER PUBLICATIONS

Yoneda Yoshihiro; Kouchi Yuji, "Flux Sheet, Flux, Fuse Element, Fuse Device, Protective Device, Short-Circuit Device, and Switching Device", May 26, 2016, Dexerials Corp., Entire Document (Translation of JP 2016095898) (of record, cited in the IDS, including Original Document). (Year: 2016).*

"Japanese Application Serial No. 2019-136245, Office Action dated Sep. 19, 2023", w English Translation, (Sep. 19, 2023), 10 pgs.

"International Application Serial No. PCT/JP2020/025818, International Preliminary Report on Patentability dated Sep. 15, 2020", w/ English Claims, (Aug. 19, 2021), 22 pgs.

"International Application Serial No. PCT/JP2020/025818, International Search Report dated Sep. 15, 2020", w/ English Translation, (Sep. 15, 2020), 5 pgs.

"International Application Serial No. PCT/JP2020/025818, Written Opinion dated Sep. 15, 2020", (Sep. 15, 2020), 5 pgs.

"Japanese Application Serial No. 2019-136245, Office Action dated Dec. 6, 2022", w/ English Translation, (Dec. 6, 2022), 11 pgs.

"Taiwanese Application Serial No. 109124966, Office Action dated Aug. 10, 2023", w English Translation, (Aug. 10, 2023), 13 pgs.

"Chinese Application Serial No. 202080051675.2, Office Action dated Nov. 24, 2023", w English Translation, (Nov. 24, 2023), 17 pgs.

"Korean Application Serial No. 10-2022-7001370, Office Action dated Feb. 28, 2024", w English Translation, (Feb. 28, 2024), 10 pgs.

* cited by examiner

PROTECTION ELEMENT

PRIORITY APPLICATIONS

This application is a U.S. National Stage Filing under 35 U.S.C. § 371 from International Application No. PCT/JP2020/025818, filed on Jul. 1, 2020, and published as WO2021/014909 on Jan. 28, 2021, which claims the benefit of priority to Japanese Patent Application No. 2019-136245, filed on Jul. 24, 2019; the benefit of priority of each of which is hereby claimed herein, and which applications and publication are hereby incorporated herein by reference in their entireties.

TECHNICAL FIELD

The present invention relates to a protection element.

BACKGROUND ART

Conventionally, protection elements including a fuse element that generates heat, fuses, and cuts off a current path when a current exceeding the rated current has flowed thereinto (fuse element) have been in use.

Examples of widely used protection elements include holder-fixed fuses having a solder enclosed in a glass tube, chip fuses in which an Ag electrode is printed on the surface of a ceramic substrate, screw-fastened or insertion type protection elements in which a part of a copper electrode is narrowed and incorporated into a plastic case, and the like. In such protection elements, since surface mounting by reflow is difficult and the efficiency of component mounting becomes poor, surface-mounted protection elements have recently been developed (for example, refer to Patent Documents 1 and 2).

Surface-mounted protection elements are employed as, for example, a protection element against overcharging or overcurrent in battery packs in which a lithium ion secondary battery is used. Lithium-ion secondary batteries are used in mobile devices such as notebook computers, mobile phones, and smart phones and, in recent years, have also been employed in electric tools, electric bikes, electric motorcycles, electric vehicles, and the like. Therefore, there has been a demand for a protection element for large-current and high-voltage uses.

In protection elements for high-voltage uses, arc discharge can be generated when a fuse element is fused. When arc discharge is generated, there is a case where the fuse element melts over a wide range and vaporized metal is scattered. In this case, there is a concern that the scattered metal may form a new current path, arc discharge may continue, and the breakdown of the protection element or an ignition accident may be caused. Therefore, to protection elements for high-voltage uses, a countermeasure for preventing the generation of arc discharge or rapidly stopping arc discharge is applied.

As the countermeasure for preventing the generation of arc discharge or stopping arc discharge, packing of an arc-extinguishing material around the fuse element is known (for example, refer to Patent Document 3).

CITATION LIST

Patent Documents

[Patent Document 1]
Japanese Patent No. 6249600

[Patent Document 2]
Japanese Patent No. 6249602
[Patent Document 3]
Japanese Patent No. 4192266

SUMMARY OF INVENTION

Technical Problem

However, for protection elements in which the above-described arc-extinguishing material is used, there is a problem in that the manufacturing processes become complicated and the size reduction of the protection elements is difficult.

In addition, as a result of using the arc-extinguishing agent under the same condition where a resin case is broken without using the arc-extinguishing material in the current cutoff tests of protection elements for large-current and high-voltage uses, there were cases where the resin case burned. The present inventors investigated the details and assumed that a molten scattered material of a fuse element adhered to an arc-extinguishing agent to form a conduction path and arc discharge was continued through this conduction path.

The present invention has been made in view of the above-described problems, and an object of the present invention is to provide a protection element capable of preventing arc discharge or promptly inhibiting arc discharge.

Solution to Problem

The present invention provides the following means to solve the above-described problems.

(1) A protection element according to one aspect of the present invention has a fuse element, an insulating inorganic fibrous material or insulating inorganic porous material that is disposed in contact with or close to at least a part of the fuse element, and a plurality of case members configured to cover at least a part of the fuse element and the insulating inorganic fibrous material or insulating inorganic porous material, wherein at least one of the case members includes a support portion configured to support the insulating inorganic fibrous material.

(2) In the aspect according to the (1), the insulating inorganic fibrous material or insulating inorganic porous material may be made of ceramic or glass.

(3) In the aspect according to any one of the (1) or (2), the insulating inorganic fibrous material or insulating inorganic porous material may have a sheet shape.

(4) In the aspect according to any one of the (1) to (3), the fuse element may have any of a flat plate shape, a rod shape, or a wire shape.

(5) In the aspect according to any one of the (1) to (4), the fuse element may be formed of a plurality of fuse elements, and the plurality of fuse elements may be disposed in parallel.

(6) In the aspect according to any one of the (1) to (5), a plurality of fuse element groups in each of which a plurality of fuse elements are disposed in parallel may be disposed in an overlapping manner.

(7) In the aspect according to any one of the (1) to (6), the insulating inorganic fibrous materials or insulating inorganic porous materials may be disposed so as to sandwich at least a part of the fuse element.

(8) In the aspect according to any one of the (1) to (7), the fuse element may be a laminate of a low-melting point metal layer and a high-melting point metal layer.

(9) In the aspect according to any one of the (1) to (8), the fuse element may be a laminate of a low-melting point metal layer and a high-melting point metal layer, and a lamination structure of the laminate may be a laminate in which an inner layer is a low-melting point metal and an outer layer is a high-melting point metal.

(10) In the aspect according to any one of the (1) to (9), the fuse element may be formed of a low-melting point metal and a high-melting point metal, and the low-melting point metal may be made of Sn or a metal containing Sn as a main component.

(11) In the aspect according to any one of the (1) to (10), the fuse element may be formed of a low-melting point metal and a high-melting point metal, and the high-melting point metal may be made of Ag, Cu, or a metal containing Ag or Cu as a main component.

(12) In the aspect according to any one of the (1) to (11), a film thickness of the low-melting point metal layer may be 30 μm or more, and a film thickness of the high-melting point metal layer may be 1 μm or more.

(13) In the aspect according to any one of the (1) to (12), the insulating inorganic fibrous material or insulating inorganic porous material may be impregnated with an insulating paste.

(14) The aspect according to any one of the (1) to (13), further having terminal members each at both end portions of the fuse element in a conduction direction, in which the fuse element and the insulating inorganic fibrous material or insulating inorganic porous material may be enclosed in the case member such that the terminal members are partially exposed.

(15) The aspect according to any one of the (1) to (13), further having an insulating substrate and two electrodes disposed apart from each other on the insulating substrate, in which the two electrodes may be each connected to each of both end portions of the fuse element in a conduction direction.

(16) The aspect according to any one of the (1) to (13), further having an insulating substrate, two electrodes disposed apart from each other on the insulating substrate, a heat generating body disposed on the insulating substrate, a heat generating body electrode connected to a first end of the heat generating body, and a heat generating body extraction electrode connected to a second end of the heat generating body and the fuse element, in which the two electrodes may be each connected to each of both end portions of the fuse element in a conduction direction.

(17) The aspect according to any one of the (1) to (16), the case member may be plastic.

(18) The aspect according to (17), the case member may be nylon-based plastic.

Advantageous Effects of Invention

According to the present invention, it is possible to provide a protection element capable of preventing arc discharge or promptly inhibiting arc discharge.

DESCRIPTION OF EMBODIMENTS

Hereinafter, the present embodiments will be described in detail with appropriate reference to the drawings. The drawings used in the following description may sometimes be drawn with specific portions enlarged as appropriate to facilitate comprehension of the features of the present invention, and the dimensional ratios and the like between the configuration elements may differ from the actual values. The materials and dimensions and the like presented in the following description are merely examples, which in no way limit the present invention, and may be altered as appropriate within the scope of the present invention. In addition, a configuration element described in only one embodiment or in only several embodiments can also be applied to other embodiments as appropriate.

First Embodiment

Figure 1:
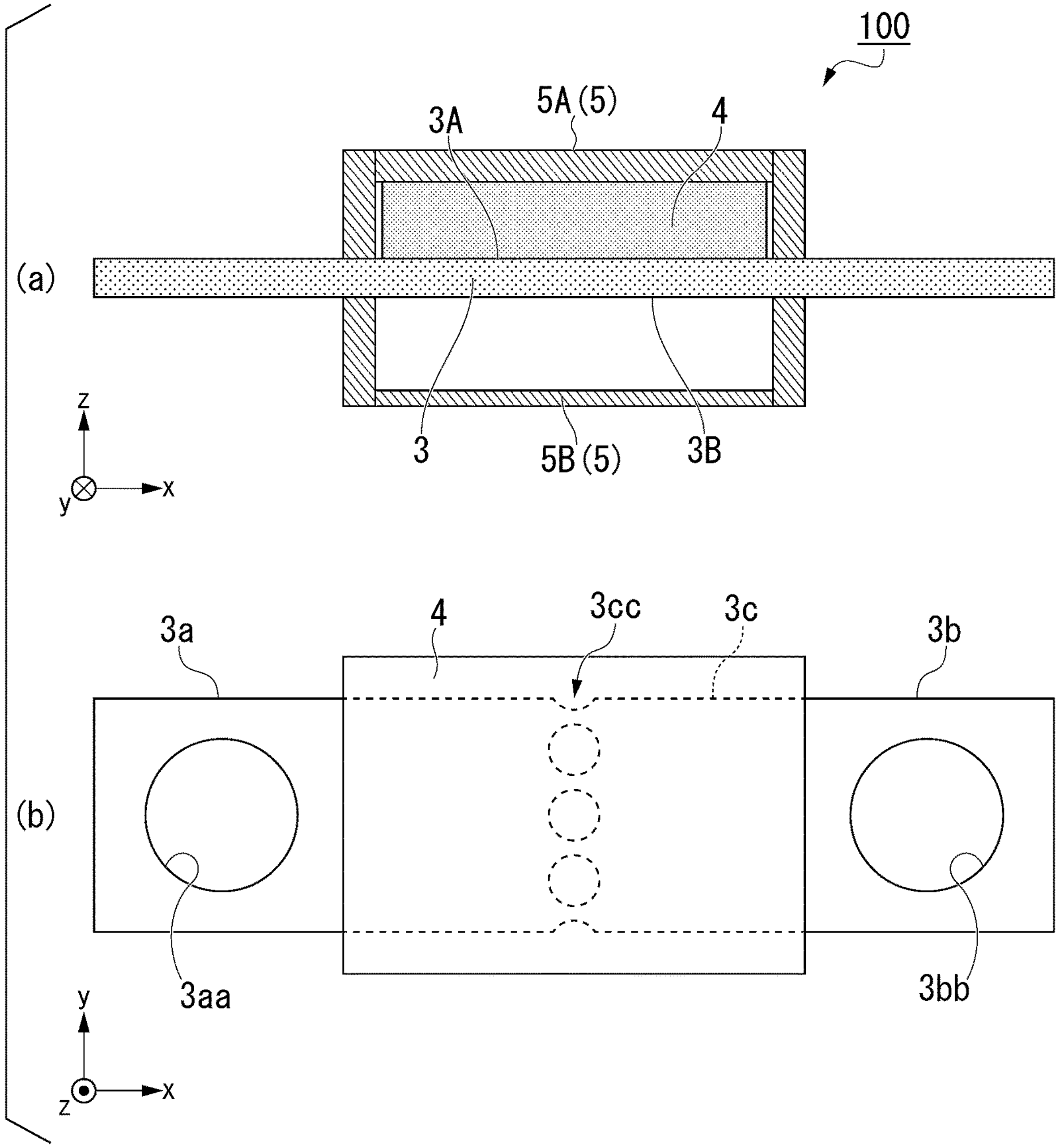
FIG. 1 shows schematic views of a protection element according to a first embodiment, wherein FIG. 1(*a*) is a schematic cross-sectional view and FIG. 1(*b*) is a schematic plan view of a state where a case member is removed.
Figure 2:
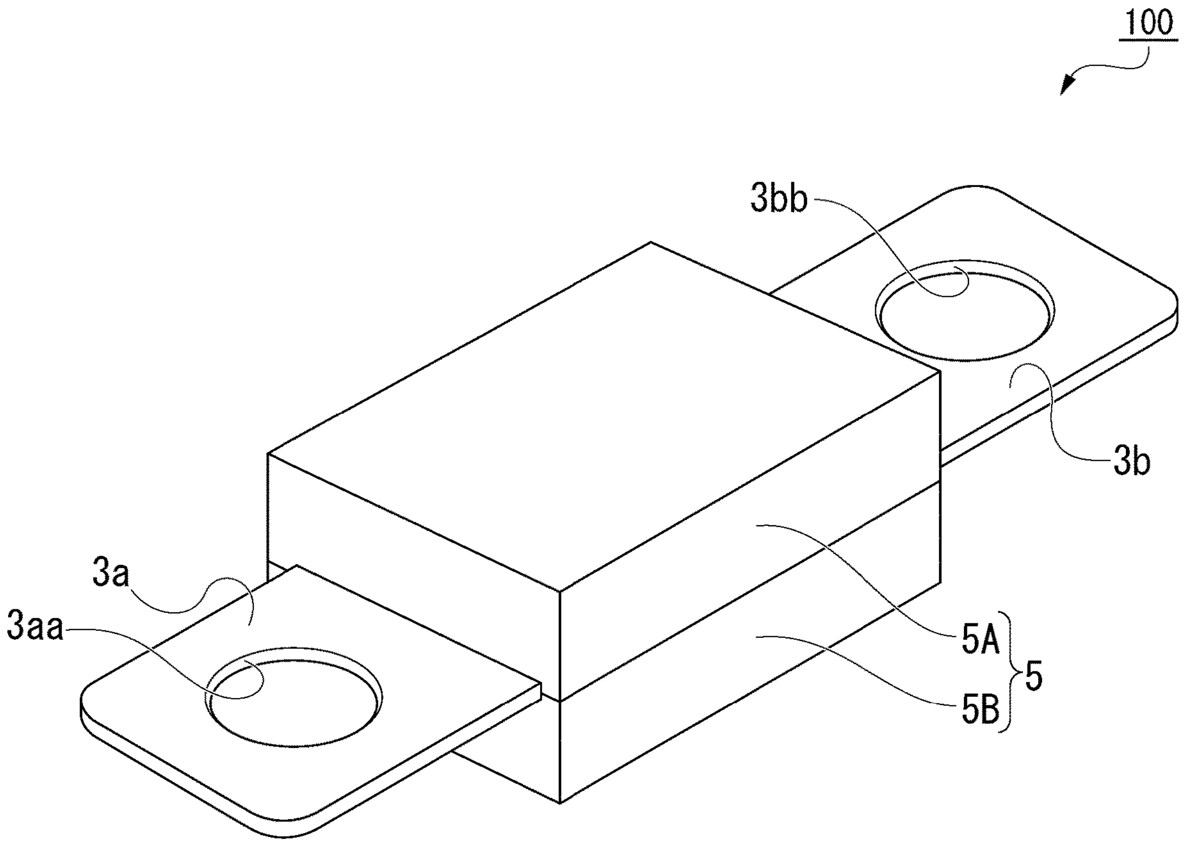
FIG. 2 is a schematic perspective view of the protection element according to the first embodiment.

FIG. 1 shows schematic views of a protection element according to a first embodiment, wherein FIG. 1(*a*) is a schematic cross-sectional view and FIG. 1(*b*) is a schematic plan view of a state where a case member is removed. FIG. 2 is a schematic perspective view of the protection element according to the first embodiment.

Hereinafter, a conduction direction in a fuse element will be referred to as the x direction, the width direction of the fuse element will be referred to as they direction, and the thickness direction of the fuse element will be referred to as the z direction.

A protection element 100 shown in FIG. 1 has a fuse element 3, an insulating inorganic fibrous material 4 that is disposed in contact with or close to at least a part of the fuse element 3, and a case member 5 that encloses a part of the fuse element 3 and the insulating inorganic fibrous material 4.

An insulating inorganic porous material may be used instead of the insulating inorganic fibrous material.

<Fuse Element>

As the fuse element 3, a fuse element made of a material that is used for well-known fuse elements can be used. Typically, a fuse element made of a metallic material containing an alloy can be used. Specifically, Pb 85%/Sn, Sn/Ag 3%/Cu 0.5%, or the like is an exemplary example.

The fuse element 3 shown in FIG. 1 is made of a single member (part), but may be a fuse element formed of a plurality of members (parts). In a case where the fuse element is formed of a plurality of members (parts), adjacent members (parts) are disposed at a distance so as not to come into contact with each other at the time of fusing. Hereinafter, each of the plurality of members (parts) configuring the fuse element will also be referred to as the fuse element.

In addition, the shape of the single member or each of the plurality of members that configures the fuse element 3 is not particularly limited as long as the fuse element 3 is capable of functioning as a fuse element, and a flat plate shape, a rod shape, and a wire shape are exemplary examples. The fuse element 3 is a flat plate-shaped member.

The fuse element 3 is formed of a first end portion 3*a* and a second end portion 3*b* located outside the case member 5 and an intermediate portion 3*c* located between the first end portion 3*a* and the second end portion 3*b*. Each of the first end portion 3*a* and the second end portion 3*b* includes an external terminal hole 3*aa* and an external terminal hole 3*bb*.

In the pair of the external terminal hole 3*aa* and the external terminal hole 3*bb*, one external terminal hole can be used to be connected to a power source side, and the other external terminal hole can be used to be connected to a load side.

Here, the shapes of the external terminal hole 3*aa* and the external terminal hole 3*bb* are not particularly limited as long as the terminal holes can be engaged with terminals of the power source side and the load side, which are not shown, and the external terminal hole 3*aa* and the external terminal hole 3*bb* shown in FIG. 1(*b*) are through-holes with no open portions, but may have a claw shape or the like having an open portion in a part.

A cut portion 3*cc* that is easily fused may be provided in a part of the intermediate portion 3*c* disposed in the case member 5 of the fuse element 3.

The cut portion 3*cc* shown in FIG. 1 is an example of a configuration in which three perforations arranged in the width direction and notches at both side ends are provided. The number of the perforations arranged in the cut portion 3*cc* is not limited to three and is an arbitrary number.

The single member or each of the plurality of members configuring the fuse element 3 may be a laminated body of a low-melting point metal layer and a high-melting point metal layer.

As a low-melting point metal that is used in the low-melting point metal layer, Sn or a metal containing Sn as the main component is preferably used. This is because the melting point of Sn is 232° C. and thus metals containing Sn as the main component have a low melting point and become soft at low temperatures. For example, the melting point of a Sn/Ag 3%/Cu 0.5% alloy is 217° C.

As a high-melting point metal that is used in the high-melting point metal layer, Ag, Cu, or a metal containing Ag or Cu as the main component is preferably used. For example, since the melting point of Ag is 962° C., and thus the high-melting point metal layer made of a metal containing Ag as the main component is capable of maintaining rigidity at temperatures at which the low-melting point metal layer becomes soft.

In a case where the fuse element 3 is made of a laminate of a low-melting point metal layer and a high-melting point metal layer, in the fuse element 3, the molten low-melting point metal layer dissolves the high-melting point metal layer (in other words, the high-melting point metal in a solid state begins to dissolve in the low-melting point metal in a molten state), whereby the high-melting point metal layer begins to melt at a temperature lower than its melting point. In the fuse element 3 in this case, it is possible to fuse the fuse element 3 at a temperature lower than the melting point of the high-melting point metal using the high-melting point metal dissolution action by the low-melting point metal (in other words, using a phenomenon in which the high-melting point metal begins to dissolve in the low-melting point metal).

From the viewpoint of promptly fusing the fuse element 3 using the high-melting point metal dissolution action by the low-melting point metal (the phenomenon in which the high-melting point metal begins to dissolve in the low-melting point metal), the film thickness of the low-melting point metal layer is preferably 30 μm or more, and the film thickness of the high-melting point metal layer is preferably 1 μm or more.

As the structure of the laminate, a variety of structures can be adopted.

Figure 3:
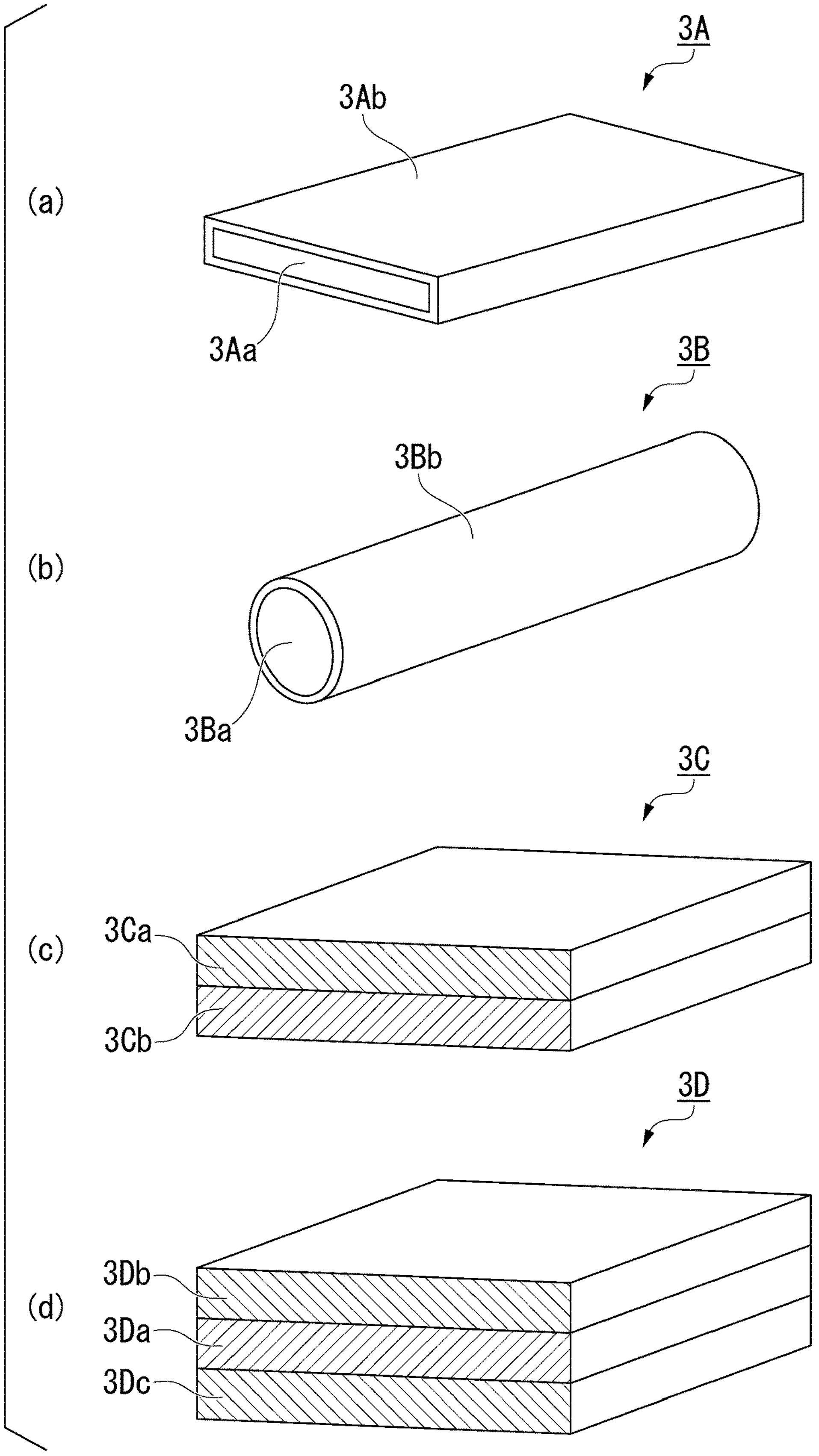
FIG. 3 schematically shows perspective views of examples of the structure of a laminate, wherein FIG. 3(*a*) is a rectangular or plate-shaped laminate in which the inner layer is a low-melting point metal layer and the outer layer is a high-melting point metal layer, FIG. 3(*b*) is a rod-shaped laminate in which the inner layer is a low-melting point metal layer and the outer layer is a high-melting point metal layer, FIG. 3(*c*) is a rectangular or plate-shaped laminate having a two-layer structure in which a low-melting point metal layer and a high-melting point metal layer are laminated together, and FIG. 3(*d*) is a rectangular or plate-shaped laminate having a three-layer structure in which a low-melting point metal layer is sandwiched between an upper high-melting point metal layer and a lower high-melting point metal layer.

FIG. 3 shows perspective views schematically showing examples of the structure of the laminate.

A laminate (fuse element) 3A shown in FIG. 3(*a*) is a rectangular or plate-shaped laminate in which the inner layer is a low-melting point metal layer 3Aa and the outer layer is a high-melting point metal layer 3Ab, but the inner layer and the outer layer may also be reversed.

A laminate (fuse element) 3B shown in FIG. 3(*b*) is a rod-shaped laminate in which the inner layer is a low-melting point metal layer 3Ba and the outer layer is a high-melting point metal layer 3Bb, but the inner layer and the outer layer may also be reversed.

A laminate (fuse element) 3C shown in FIG. 3(*c*) is a rectangular or plate-shaped laminate having a two-layer structure in which a low-melting point metal layer 3Ca and a high-melting point metal layer 3Cb are laminated together.

A laminate (fuse element) 3D shown in FIG. 3(*d*) is a rectangular or plate-shaped laminate having a three-layer structure in which a low-melting point metal layer 3Da is sandwiched between an upper high-melting point metal layer 3Db and a lower high-melting point metal layer 3Dc. Alternatively, a high-melting point metal layer may be sandwiched between two low-melting point metal layers in the three-layer structure.

FIGS. 3(*a*) to (*d*) show two-layer or three-layer laminates, but the laminate may have four or more layers.

In a case where the fuse element 3 is a laminate formed of three layers of an inner layer and outer layers that sandwich the inner layer, it is preferable that the inner layer is a low-melting point metal layer and the outer layers are high-melting point metal layers, but the outer layers may be low-melting point metal layers, and the inner layer may be a high-melting point metal layer.

<Insulating Inorganic Fibrous Material or Insulating Inorganic Porous Material>

The insulating inorganic fibrous material 4 has an insulating property so as not to affect the electrical characteristics such as the fusion of the fuse element 3, is made of an inorganic material, and has a space in which a molten scattered material is scattered.

The protection element 100 shown in FIG. 1 includes the insulating inorganic fibrous material 4 disposed in contact with or close to at least a part of the fuse element 3 on one side 3A of the fuse element 3. In the protection element 100 shown in FIG. 1, the insulating inorganic fibrous material 4 is placed on the one side 3A of the fuse element 3.

The insulating inorganic fibrous material may also be provided on the other side 3B of the fuse element 3. In this case, the fuse element 3 is sandwiched by two insulating inorganic fibrous materials from both sides in the thickness direction.

As an inorganic fiber that configures the insulating inorganic fibrous material 4 (inorganic fiber), a well-known inorganic fiber can be used. Specific examples thereof include ceramic fibers, glass fibers, and the like. In the present specification, the ceramic fiber refers to an inorganic fiber containing a ceramic material as the main component and excludes glass fibers, and the glass fiber refers to a fiber containing $SiO_2$ as the main component.

Specific examples of the ceramic fiber include fibers made of alumina ($Al_2O_3$), zirconia ($ZrO_2$), magnesia (MgO), mullite, silicon carbide (SiC), or the like and fibers containing these as the main component.

Examples of commercially available products of the inorganic fiber include ceramic paper and ceramic fiber paper (manufactured by Sakaguchi E. H. VOC Corp., manufactured by Takumi Sangyou Ltd., and manufactured by Nicoh Co., Ltd.), and the like.

The thickness of the insulating inorganic fibrous material 4 can be set to be approximately the same as the distance between an upper case member 5A and the fuse element 3 as shown in FIG. 1(*a*). Alternatively, the insulating inorganic fibrous material 4 thicker than the distance between the upper case member 5A and the fuse element 3 may be held down by the upper case member 5A. In this case, a portion where the insulating inorganic fibrous material 4 comes into contact with the fuse element 3 becomes large.

Figure 4:
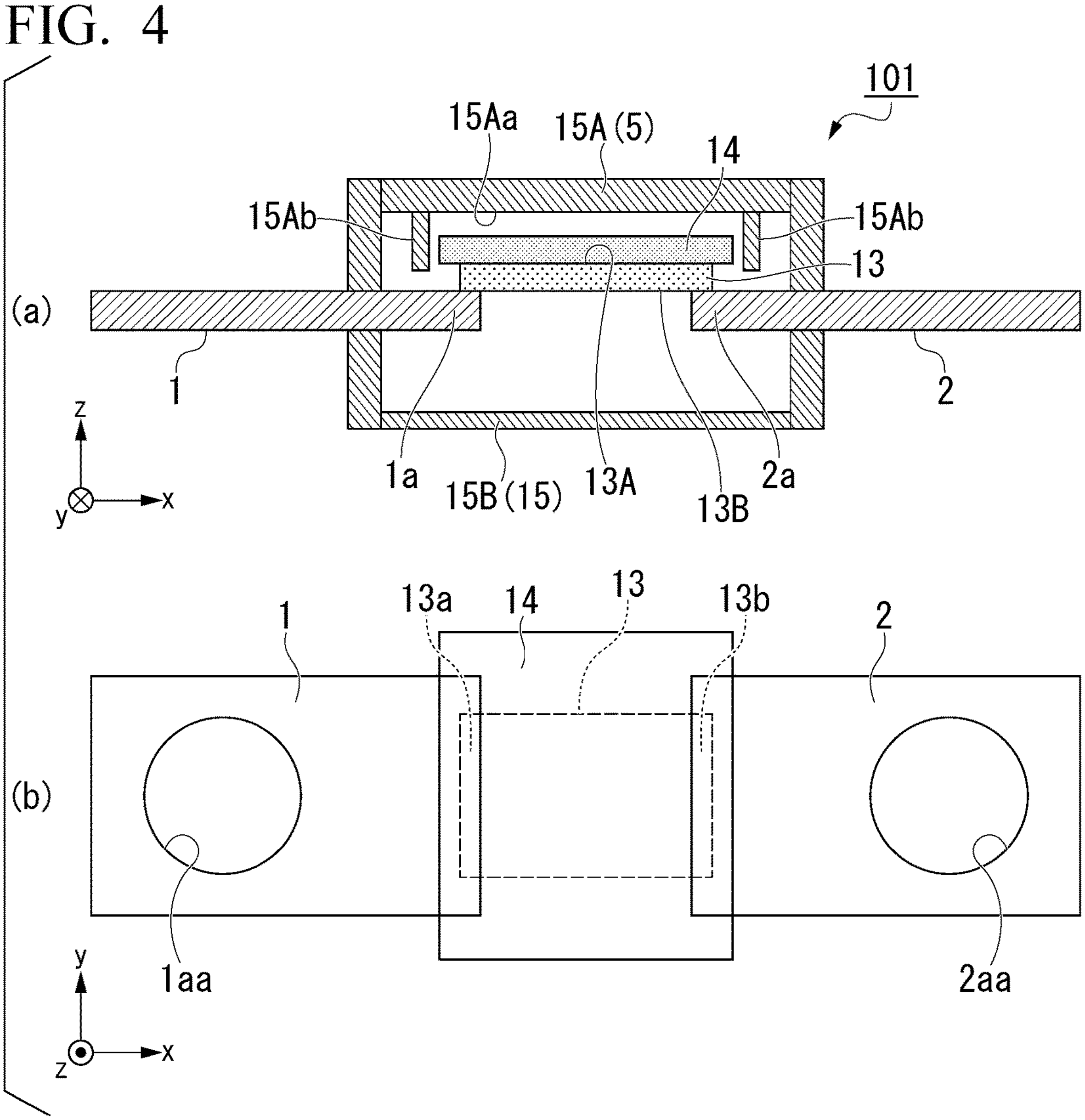
FIG. 4 shows schematic views of a protection element according to a second embodiment, wherein FIG. 4(*a*) is a schematic cross-sectional view and FIG. 4(*b*) is a schematic plan view of a state where a case member is removed.

Alternatively, it is also possible to make the insulating inorganic fibrous material thinner than the distance between the upper case member and the fuse element as shown in FIG. 4 or the like described below. That is, there is a gap between the insulating inorganic fibrous material 4 and the upper case member. Even in this case, there is a portion where the insulating inorganic fibrous material 4 comes into contact with the fuse element 3 due to its weight.

When the width (length in the y direction) of the insulating inorganic fibrous material 4 is approximately the same as or larger than the width of the fuse element 3 as shown in FIG. 1 (*b*), the effect on arc prevention or arc continuation inhibition is strong; however, even when the width is smaller than the width of the fuse element 3, the effect is exhibited.

The length (length in the x direction) of the insulating inorganic fibrous material 4 can be set to be substantially almost the same as the internal length of the upper case member 5A as shown in FIG. 1 (*a*). In this case, no matter where in the case member the fuse element 3 is fused, the effect on arc discharge prevention or arc discharge continuation inhibition can be obtained. The insulating inorganic fibrous material 4 can also be set to be shorter than the internal length of the upper case member 5A.

The examples shown in the drawings show the cases where only one insulating inorganic fibrous material is provided, but a plurality of insulating inorganic fibrous materials may be provided.

As described above, an insulating inorganic porous material may be used instead of the insulating inorganic fibrous material.

As a material of the insulating inorganic porous material, a well-known inorganic porous material can be used. Specific examples thereof include insulating inorganic porous materials made of alumina ($Al_2O_3$), silica ($SiO_2$), zirconia ($ZrO_2$), magnesia (MgO), mullite, silicon carbide (SiC), or the like and insulating inorganic porous materials containing these as the main component.

As the material of the insulating inorganic fibrous material or insulating inorganic porous material, a material having a high thermal conductivity is preferable. This aims to enhance a function of dissipating heat from the fuse element 3 (a function of cooling the fuse element 3) and thereby enhance the effect on arc discharge prevention or arc discharge continuation inhibition.

While glass has a thermal conductivity of approximately 1 W/mK, regarding oxide-based ceramics, magnesia has a thermal conductivity of approximately 30 W/mK, alumina has a thermal conductivity of approximately 20 W/mK, mullite has a thermal conductivity of approximately 4 W/mK, and zirconia has a thermal conductivity of approximately 3 W/mK. In addition, silicon carbide has a thermal conductivity of approximately 100 W/mK or more.

The insulating inorganic fibrous material or insulating inorganic porous material has a space in which the molten scattered material is scattered at the time of arc discharge. When there is a space in which the molten scattered material from the fuse element is scattered due to arc discharge, the molten scattered material does not form any conduction path, and the continuation of arc discharge can be prevented. The density of the insulating inorganic fibrous material or insulating inorganic porous material is preferably $1/100$ to $1/4$ of the density in a case where there are no holes or gaps (the density of the material) from the viewpoint of securing a space in which the molten scattered material is scattered due to arc discharge. For example, the density of alumina is 3.95 $g/cm^3$, but an alumina fiber or alumina porous material having a density of 0.04 $g/cm^3$ to 1.0 $g/cm^3$ is preferably used.

Even in a case where the insulating inorganic fibrous material or insulating inorganic porous material is not in direct contact with the fuse element 3 during normal operation, when the insulating inorganic fibrous material or insulating inorganic porous material is disposed close to the fuse element 3, a cut portion of the fuse element swells at the time of fusing and comes into direct contact with the insulating inorganic fibrous material or insulating inorganic porous material, and thus the effect on prevention of the continuation of an arc phenomenon can be obtained by cooling the fuse element.

In the present specification, the expression "close to" means the distance is 1 mm or less.

In a case where the insulating inorganic fibrous material or insulating inorganic porous material is close to at least a part of the fuse element, the distance is preferably 0.5 mm or less, more preferably 0.2 mm or less, and still more preferably 0.1 mm or less.

<Insulating Paste>

The insulating inorganic fibrous material or insulating inorganic porous material may be impregnated with an insulating paste.

The insulating paste is a fluid insulating substance capable of entering gaps between fibers of the insulating inorganic fibrous material or holes in the insulating inorganic porous material. When the insulating paste is included, an effect on insulation by the dispersion of the molten scattered material of the fuse element can be enhanced.

Examples of the insulating paste include fluxes that are used at the time of soldering.

As a result of using a ceramic paper impregnated with a flux as the insulating inorganic fibrous material by the present inventors, the insulation resistance after cutoff becomes higher by two to four orders of magnitude compared with a case where ceramic paper impregnated with no flux is used. The reason for the increase in the insulation resistance is considered that not only does the molten scattered material of the fuse element enter gaps between fibers of the insulating inorganic fibrous material or holes in the insulating inorganic porous material, but the molten scattered material in the gaps or holes is also covered with the flux, which causes the molten scattered material to be aggregate in each gap or each hole and to become discontinuous.

Hereinafter, the insulating inorganic fibrous material or insulating inorganic porous material impregnated with the insulating paste will also be simply referred to as the insulating inorganic fibrous material or insulating inorganic porous material.

<Case Member>

The case member 5 protects the inside and prevents the scattering of the molten fuse element 3. The case member 5 shown in FIG. 1 is formed of the upper case member 5A and a lower case member 5B.

The case member 5 can be formed of an insulating material, for example, engineering plastic (in particular, a nylon-based plastic having high tracking resistance is preferable), alumina, glass ceramic, mullite, zirconia, or the like.

The case member 5 is preferably formed of a ceramic material having a high thermal conductivity such as alumina. It becomes possible to efficiently dissipate heat generated by the fuse element due to overcurrents to the outside and to locally heat and fuse the fuse element held in the hollow.

Next, the upper case member 5A and the lower case member 5B can be attached to each other with, for example, an adhesive, which makes the fuse element 3 covered and the protection element 100 formed.

Second Embodiment

FIG. 4 shows schematic views of a protection element according to a second embodiment, wherein FIG. 4(*a*) is a schematic cross-sectional view and FIG. 4(*b*) is a schematic plan view of a state where a case member is removed.

Members with the same reference sign as in the first embodiment have the same configuration and will not be described again. In addition, there will be cases where members with a different reference sign but having the same function as in the first embodiment are not described again.

A protection element 101 shown in FIG. 4 has a fuse element 13, an insulating inorganic fibrous material 14 that is disposed in contact with or close to at least a part of the fuse element 13, and a case member 15 that encloses the fuse element 13 and the insulating inorganic fibrous material 14.

Furthermore, the protection element 101 has a first terminal member 1 and a second terminal member 2 disposed apart from each other, the first terminal member 1 is connected to a first end portion 13*a* of the fuse element 13, and the second terminal member 2 is connected to a second end portion 13*b* of the fuse element 13.

An insulating inorganic porous material may be used instead of the insulating inorganic fibrous material.

<Insulating Inorganic Fibrous Material>

The protection element 101 shown in FIG. 4 includes the insulating inorganic fibrous material 14 disposed in contact with or close to at least a part of the fuse element 13 on one side 13A of the fuse element 13. In the protection element 101 shown in FIG. 4, the insulating inorganic fibrous material 14 is placed on the one side 13A of the fuse element 3.

The insulating inorganic fibrous material may also be provided on the other side 13B of the fuse element 13. In this case, the fuse element 13 is sandwiched by two insulating inorganic fibrous materials from both sides in the thickness direction.

<First Terminal Member and Second Terminal Member>

The first terminal member 1 and the second terminal member 2 are each preferably made of a material that reinforces the rigidity of the fuse element for external connection and reduces the electrical resistance.

The first terminal member 1 has an external terminal hole 1*aa*. In addition, the second terminal member 2 has an external terminal hole 2*aa*.

In the protection element 101 shown in FIG. 4, a first end portion 1*a* of the first terminal member 1 is connected so as to overlap the first end portion 13*a* of the fuse element 13 in the thickness direction, and a second end portion 2*a* of the second terminal member 2 is connected so as to overlap the second end portion 13*b* in the thickness direction.

Examples of materials of the first terminal member and the second terminal member include copper, brass, and the like.

Among them, brass is preferable from the viewpoint of strengthening the rigidity.

Among them, copper is preferable from the viewpoint of reducing the electrical resistance.

The materials of the first terminal member and the second terminal member may be the same as or different from each other.

As a method for connecting the first terminal member and the second terminal member to the first end portion and the second end portion, a well-known method can be used, and examples thereof include joining by soldering or welding, mechanical joining such as riveting or screwing, and the like.

While not limiting the thicknesses of the first terminal member and the second terminal member, a rough standard can be set to 0.3 to 1.0 mm.

The thicknesses of the first terminal member and the second terminal member may be the same as or different from each other.

<Case Member>

The case member 15 shown in FIG. 4 is, similar to the case member 5 shown in FIG. 1, formed of an upper case member 15A and a lower case member 15B. Incidentally, a difference lies in the fact that the upper case member 15A has protruding portions 15Ab extending from a top surface 15Aa toward the fuse element 13 up to at least the side surfaces of the insulating inorganic fibrous material 14. The upper case member 15A includes the protruding portions 15Ab, whereby the movement of the side surfaces of the insulating inorganic fibrous material 14 is regulated, which makes it possible to prevent the positional deviation of the insulating inorganic fibrous material 14.

Third Embodiment

Figure 5:
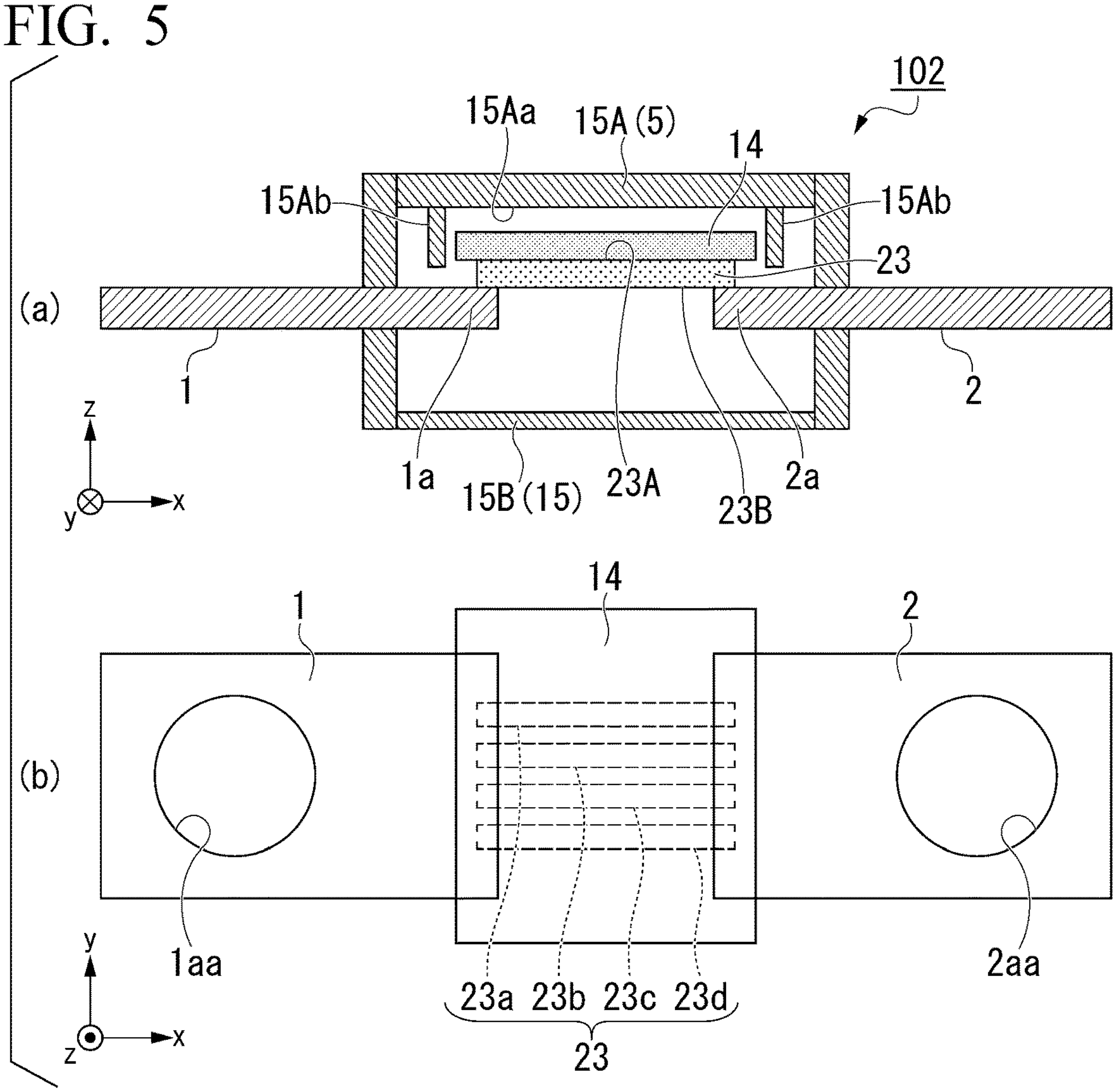
FIG. 5 shows schematic views of a protection element according to a third embodiment, wherein FIG. 5(*a*) is a schematic cross-sectional view and FIG. 5(*b*) is a schematic plan view of a state where a case member is removed.

FIG. 5 shows schematic views of a protection element according to a third embodiment, wherein FIG. 5(*a*) is a schematic cross-sectional view and FIG. 5(*b*) is a schematic plan view of a state where a case member is removed.

Members with the same reference sign as in the above-described embodiments have the same configuration and will not be described again. In addition, there will be cases where members with a different reference sign but having the same function as in the above-described embodiments are not described again.

A protection element 102 shown in FIG. 5 has four fuse elements 23*a*, 23*b*, 23*c*, and 23*d* (which will be collectively referred to as "fuse element 23" in some cases), the insulating inorganic fibrous material 14 that is disposed in contact with or close to at least a part of the fuse elements 23*a*, 23*b*, 23*c*, and 23*d*, and the case member 15 that encloses the fuse element 23 and the insulating inorganic fibrous material 14.

In addition, the protection element 102 has the first terminal member 1 and the second terminal member 2 disposed apart from each other, and each of the four fuse elements 23*a*, 23*b*, 23*c*, and 23*d* is connected to the first terminal member 1 and the second terminal member 2 at both ends.

An insulating inorganic porous material may be used instead of the insulating inorganic fibrous material.

<Fuse Element>

The fuse element 23 shown in FIG. 5 is formed of the four fuse elements 23*a*, 23*b*, 23*c*, and 23*d*, but may be formed of a plurality of fuse elements other than the four.

In a case where the fuse element is formed of a plurality of fuse elements, the materials or shapes of the individual fuse elements may be the same as or different from each other. For example, each fuse element may have a different resistance.

In a case where the fuse element is formed of a plurality of fuse elements (parts), adjacent fuse elements (parts) are disposed at a distance so as not to come into contact with each other at the time of fusing.

The fuse element 23 is formed of the plurality of fuse elements, whereby, even in a case where arc discharge is generated when each fuse element is fused, the arc discharge becomes small, and it is possible to prevent the explosive scattering of molten metal.

The four fuse elements 23*a*, 23*b*, 23*c*, and 23*d* shown in FIG. 5 are disposed in parallel.

When the plurality of fuse elements are disposed in parallel, it is possible to easily realize the cooling of each fuse element and the dispersion of the molten scattered material with the insulating inorganic fibrous material 4 and to improve the arc resistance.

In addition, as described above, a flat plate shape, a rod shape, or a wire shape is an example of the shape of the fuse element. The four fuse elements 23*a*, 23*b*, 23*c*, and 23*d* shown in FIG. 5 are an example of a rod-shaped or wire-shaped fuse element.

The protection element 102 shown in FIG. 5 has a configuration in which the four fuse elements are disposed in parallel in a plane parallel to the xy plane, but may have a configuration in which a fuse element group disposed in parallel are disposed in a plurality of tiers in the z direction.

Figure 6:
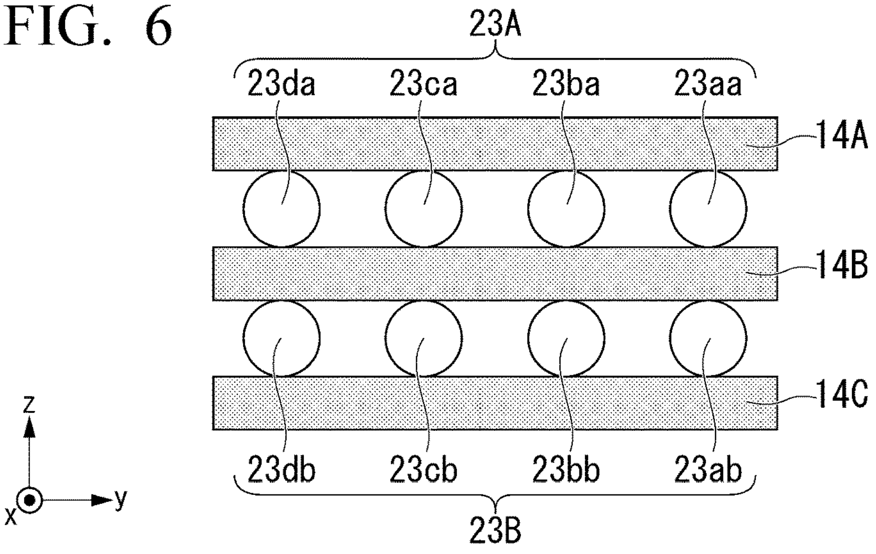
FIG. 6 is a schematic cross-sectional view showing a configuration in which fuse element groups in which four fuse elements are disposed in parallel are disposed in two tiers in a z direction.

FIG. 6 shows a configuration in which fuse element groups in which four fuse elements are disposed in parallel are disposed in two tiers in the z direction. That is, a fuse element group 23A in which four fuse elements 23*aa*, 23*ba*, 23*ca*, and 23*da* are disposed in parallel and a fuse element group 23B in which four fuse elements 23*ab*, 23*bb*, 23*cb*, and 23*db* are disposed in parallel are disposed in the z direction. In each of the fuse element group 23A and the fuse element group 23B, the configuration of the fuse elements may be different (in material, thickness, or the like).

In the configuration in which fuse element groups in which fuse elements are disposed in parallel are disposed in a plurality of tiers, a plurality of pieces of the insulating inorganic fibrous material may be provided.

In the configuration shown in FIG. 6, an insulating inorganic fibrous material 14A, an insulating inorganic fibrous material 14B, and an insulating inorganic fibrous material 14C are each provided at positions closest to the case member and between the fuse element group 23A and the fuse element group 23B.

Fourth Embodiment

Figure 7:
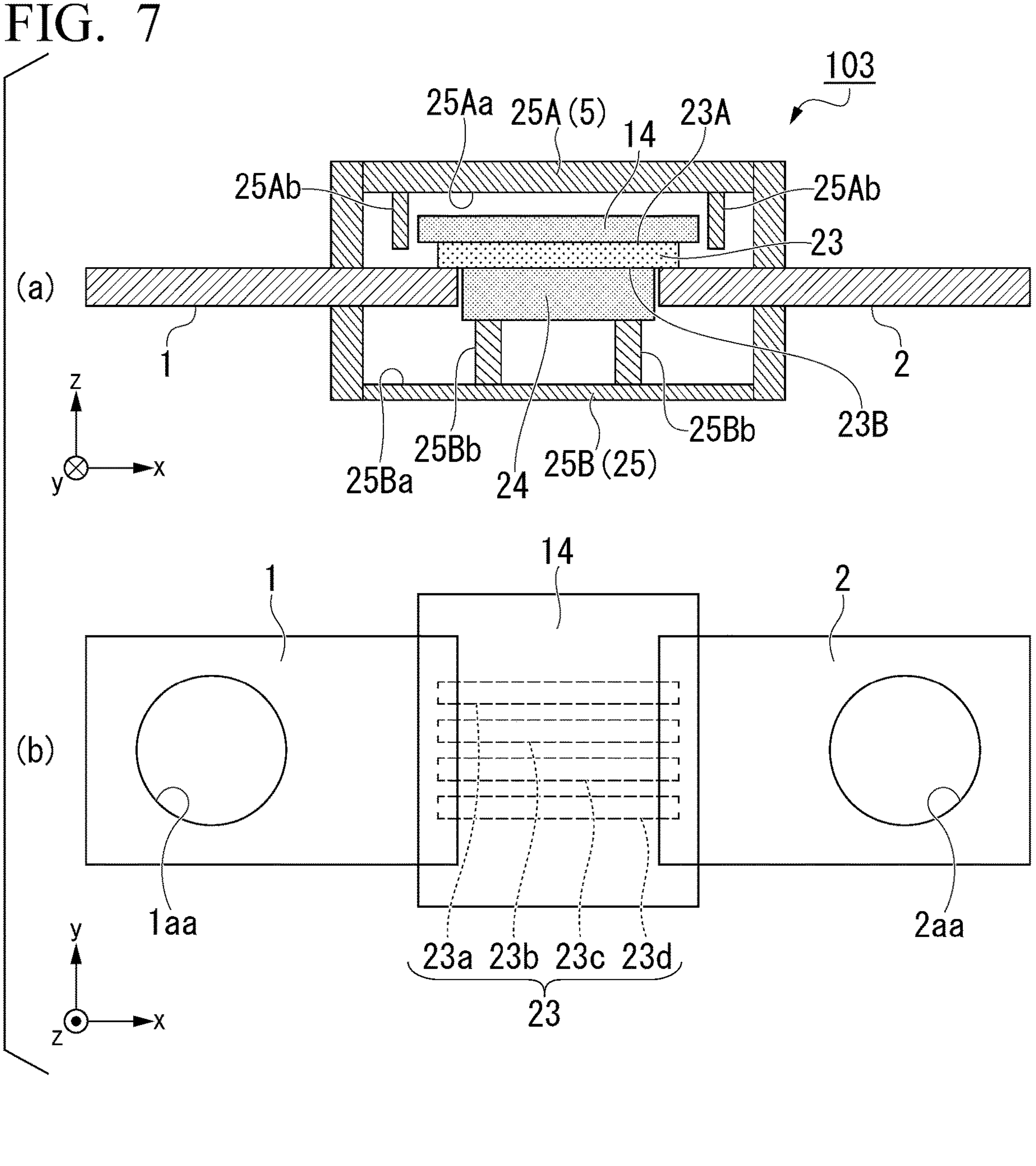
FIG. 7 shows schematic views of a protection element according to a fourth embodiment, wherein FIG. 7(*a*) is a schematic cross-sectional view and FIG. 7(*b*) is a schematic plan view of a state where a case member is removed.

FIG. 7 shows schematic views of a protection element according to a fourth embodiment, wherein FIG. 7(*a*) is a schematic cross-sectional view and FIG. 7(*b*) is a plan view in which a case member is removed.

Members with the same reference sign as in the above-described embodiments have the same configuration and will not be described again. In addition, there will be cases where members with a different reference sign but having the same function as in the above-described embodiments are not described again.

Compared with the protection element 102 shown in FIG. 5, a protection element 103 shown in FIG. 7 is mainly different in terms of the fact that an insulating inorganic fibrous material 24 is provided on a side of the fuse element 23 opposite to the side on which the insulating inorganic fibrous material 14 is disposed, that is, the insulating inorganic fibrous material 24 is provided so as to sandwich the fuse element 23 together with the insulating inorganic fibrous material 14.

The protection element 103 has the four fuse elements 23*a*, 23*b*, 23*c*, and 23*d* (which will be collectively referred to as "fuse element 23" in some cases), the insulating inorganic fibrous material 14 and the insulating inorganic fibrous material 24 that are disposed in contact with or close to at least a part of the fuse element 23 and disposed so as to sandwich the fuse element 23 from both sides in the thickness direction, and a case member 25 that encloses the fuse element 23 and the insulating inorganic fibrous material 14 and the insulating inorganic fibrous material 24.

In addition, the protection element 103 has the first terminal member 1 and the second terminal member 2 disposed apart from each other, and each of the four fuse elements 23*a*, 23*b*, 23*c*, and 23*d* is connected to the first terminal member 1 and the second terminal member 2 at both ends.

An insulating inorganic porous material may be used instead of the insulating inorganic fibrous material. For example, an insulating inorganic porous material may be used instead of either the insulating inorganic fibrous material 14 or the insulating inorganic fibrous material 24, and insulating inorganic porous materials may be used instead of the insulating inorganic fibrous material 14 and the insulating inorganic fibrous material 24.

<Case Member>

The case member 25 shown in FIG. 7 is common with the case member 15 shown in FIG. 4 in terms of the fact that the case member 25 is formed of an upper case member 25A and a lower case member 25B and the fact that the upper case member 25A has protruding portions 25Ab extending from a top surface 25Aa toward the fuse element 23 up to at least the side surfaces of the insulating inorganic fibrous material 14. The thickness of the insulating inorganic fibrous material 14 is preferably a thickness from the surface of the fuse element 23 to the top surface 25Aa of the upper case member 25A, but may be a thickness that brings insulating inorganic fibrous material 14 from the surface of the fuse element 23 into contact with the top surface 25Aa of the upper case member 25A.

On the other hand, on a lower surface 25Ba side of the lower case member 25B, support portions 25Bb are provided to support the insulating inorganic fibrous material 24 so as to come into contact with or close to the fuse element 23. A method for supporting the insulating inorganic fibrous material 24 is not limited thereto, and the insulating inorganic fibrous material 24 may be, for example, simply placed on the lower surface 25Ba of the lower case member 25B.

Fifth Embodiment

Figure 8:
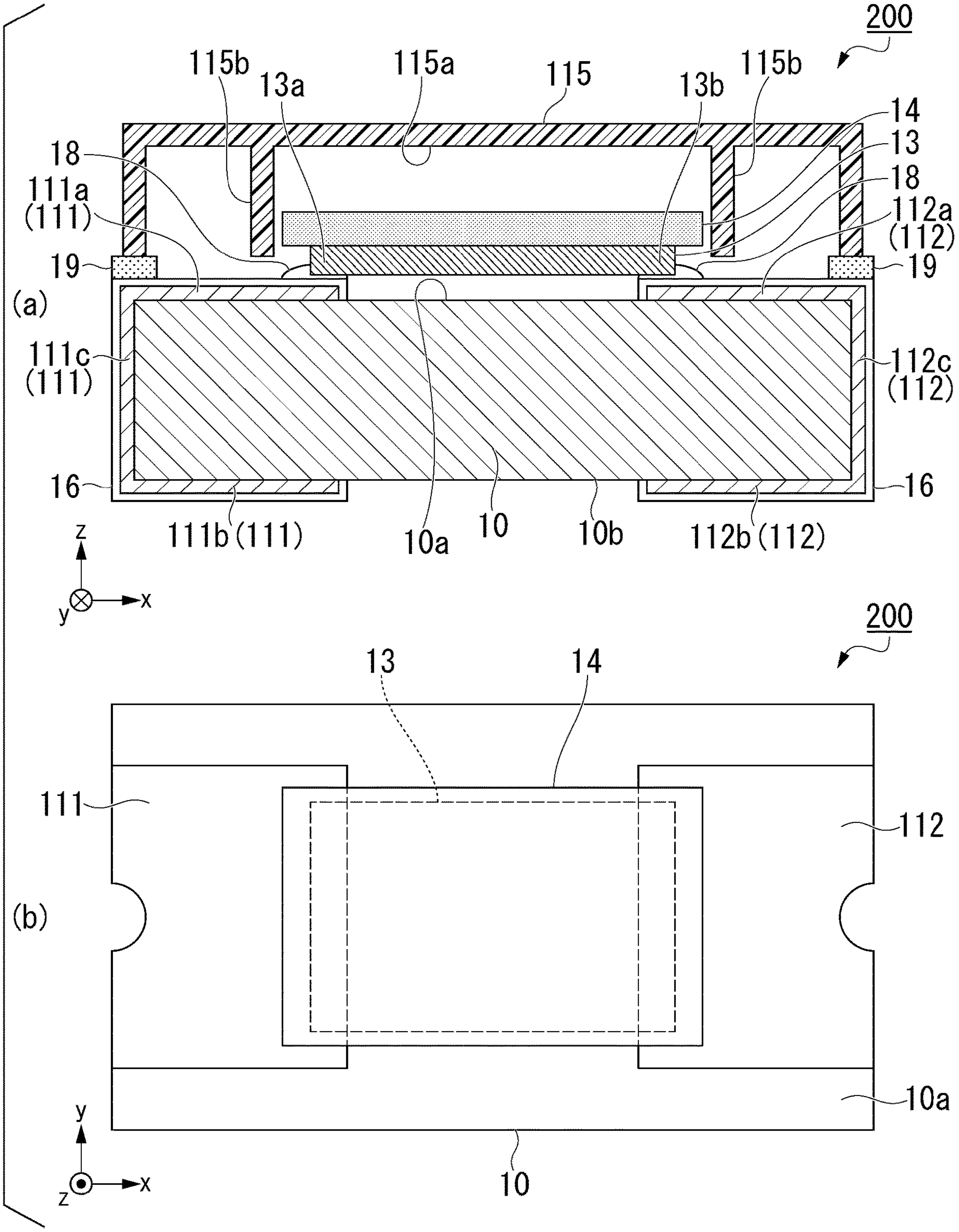
FIG. 8 shows schematic views of a protection element according to a fifth embodiment, wherein FIG. 8(*a*) is a schematic cross-sectional view and FIG. 8(*b*) is a schematic plan view of a state where a case member is removed.

FIG. 8 shows schematic views of a main portion of a protection element according to a fifth embodiment, wherein FIG. 8(*a*) is a schematic cross-sectional view and FIG. 8(*b*) is a schematic plan view of a state where a case member is removed.

Members with the same reference sign as in the above-described embodiments have the same configuration and will not be described again. In addition, there will be cases where members with a different reference sign but having the same function as in the above-described embodiments are not described again.

A protection element 200 shown in FIG. 8 has an insulating substrate 10, two electrodes 111 and 112 disposed apart from each other on the insulating substrate 10, the fuse element 13, the insulating inorganic fibrous material 14 that is disposed in contact with or close to at least a part of the fuse elements 13 on the case member 115 side, and a case member 115 that encloses the fuse element 13 and the insulating inorganic fibrous material 14, and the two electrodes 111 and 112 are connected to both end portions 13*a* and 13*b* of the fuse element 13 in a conduction direction.

An insulating inorganic porous material may be used instead of the insulating inorganic fibrous material.

<Insulating Substrate>

The insulating substrate 10 is a substrate formed in a rectangular shape using an insulating member such as alumina, glass ceramic, mullite, or zirconia. In addition, for the insulating substrate 10, a material that is used for printed wiring boards such as a glass epoxy substrate or a phenol substrate may also be used.

The insulating substrate 10 preferably has a flat plate shape. The thickness of the insulating substrate 10 varies depending on the heat resistance or thermal conduction properties of the insulating substrate 10, but is generally preferably within a range of 100 μm to 1000 μm. In addition, the outer periphery of the insulating substrate 10 may be raised like a wall.

<First Electrode and Second Electrode>

The first electrode 111 and the second electrode 112 are formed on the insulating substrate 10. The first electrode 111 is formed of a first front surface electrode 111*a* formed on a front surface 10*a* of the insulating substrate 10, a first back surface electrode 111*b* formed on a back surface 10*b* of the insulating substrate 10, and a castellation 111*c* that connects the first front surface electrode 111*a* and the first back surface electrode 111*b*. Similarly, the second electrode 112 is formed of a second front surface electrode 112*a* formed on a front surface 10*a* of the insulating substrate 10, a second back surface electrode 112*b* formed on a back surface 10*b* of the insulating substrate 10, and a castellation 112*c* that connects the second front surface electrode 112*a* and the second back surface electrode 112*b*.

The first electrode 111 and the second electrode 112 are each formed of a conductive pattern such as Ag or Cu wiring, and a protective layer 16 such as a Sn plating, a Ni/Au plating, a Ni/Pd plating, or a Ni/Pd/Au plating is appropriately provided on the surface as antioxidant countermeasure. The protection element 200 is mounted on a current path in a circuit board through the first back surface electrode 111*b* and the second back surface electrode 112*b* formed on the back surface 10*b*.

The first electrode 111 and the second electrode 112 are connected to both end portions 13*a* and 13*b* of the fuse element 13 in the conduction direction through connecting materials 18 such as solder. As described above, the fuse element 13 can be easily connected by reflow soldering or the like after being mounted between the first electrode 111 and the second electrode 112 through the connecting materials 18.

<Fuse Element>

As the fuse element 13, the same fuse element as described above can be used.

<Insulating Inorganic Fibrous Material>

As the insulating inorganic fibrous material 14, the same insulating inorganic fibrous material as described above can be used.

Figure 9:
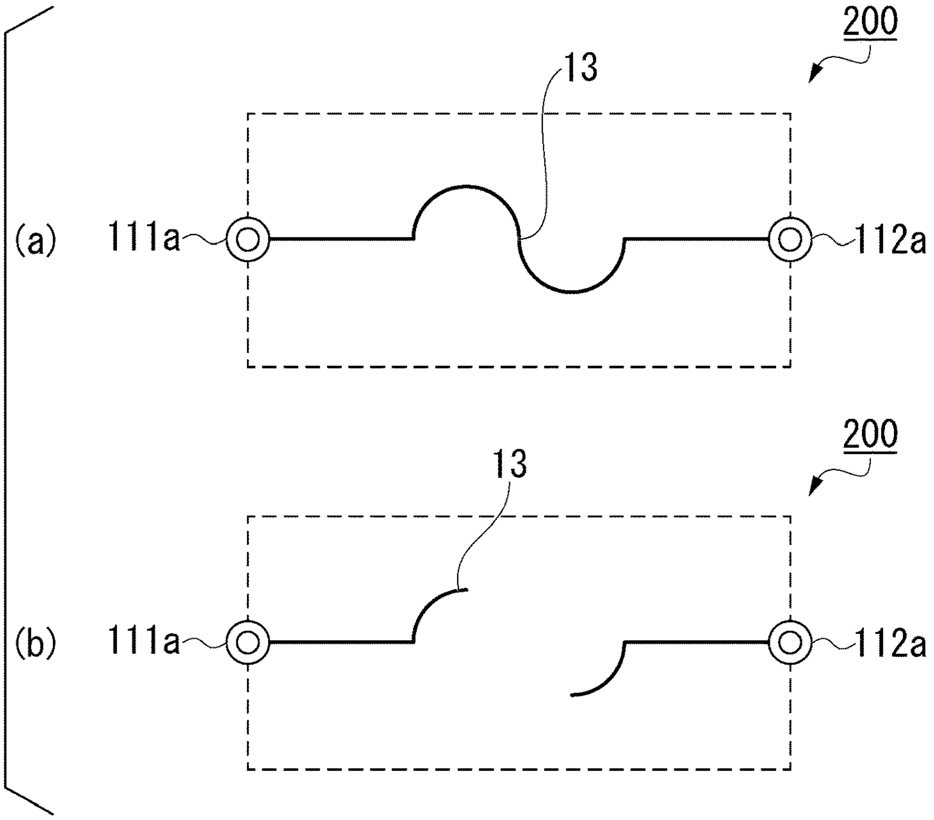
FIG. 9(*a*) is a circuit diagram before a fuse element in the protection element according to the fifth embodiment is fused, and FIG. 9(*b*) is a circuit diagram after the fuse element is fused.

The protection element 200 shown in FIG. 8 has a circuit configuration shown in FIG. 9(*a*). The protection element 200 is incorporated onto a current path of an external circuit by being mounted on the external circuit through the first external connection electrode 111*a* and the second external connection electrode 112*a*. The protection element 200 is not fused even by self-generated heat while a predetermined rated current flows in the fuse element 13. On the other hand, in the protection element 200, when an overcurrent exceeding the rated current is conducted, the fuse element 13 is fused by self-generated heat, and the first electrode 111 and the second electrode 112 are cut off, whereby the current path of the external circuit is cut off (FIG. 9 (*b*)).

In the protection element 200, in a case where the fuse element 13 is a laminate of a low-melting point metal layer and a high-melting point metal layer, since the low-melting point metal layer having a lower melting point than the high-melting point metal layer is laminated in the fuse element 13, the low-melting point metal layer melted by heat self-generated by the overcurrent begins to dissolve the high-melting point metal layer. Therefore, in the protection element 200, the high-melting point metal layer can be melted at a temperature lower than its melting point using the high-melting point metal layer dissolution action of the low-melting point metal layer of the fuse element 13 and can be rapidly fused. Since the insulating inorganic fibrous material 14 is provided, arc discharge is rapidly stopped even when generated at the time of fusing.

Furthermore, since the molten metal of the fuse element 13 is horizontally divided by a physical pulling action of the first electrode 111 and the second electrode 112, it is possible to rapidly and reliably cut off the current path between the first electrode 111 and the second electrode 112.

<Manufacturing Method>

An example of a method for manufacturing the protection element 200 will be described.

The first electrode 111 and the second electrode 112 are each patterned on both opposite end portions of the insulating substrate 10 by the screen printing or the like of Ag or Cu wiring or the like, and the protective layer 16 such as Sn, Ni/Au, Ni/Pd, or Ni/Pd/Au is appropriately formed on the surface by plating as a countermeasure for oxidation prevention and electrode erosion, thereby manufacturing a base portion.

Next, the connecting materials 18 such as solder pastes are applied onto the first electrode 111 and the second electrode 112 on the front surface 10*a* side of the insulating substrate 10, and the fuse element 13 is connected to the first electrode 111 and the second electrode 112. Therefore, the fuse element 13 is mounted on the first electrode 111 and the second electrode 112. Next, the insulating inorganic fibrous material 14 is placed on the fuse element 13.

Next, an adhesive 19 is applied to the front surface 10*a* side of the insulating substrate 10 in a predetermined range, and then the case member 115 is attached thereto, whereby the fuse element 13 and the insulating inorganic fibrous material 14 are covered, and the protection element 200 is completed.

Sixth Embodiment

Figure 10:
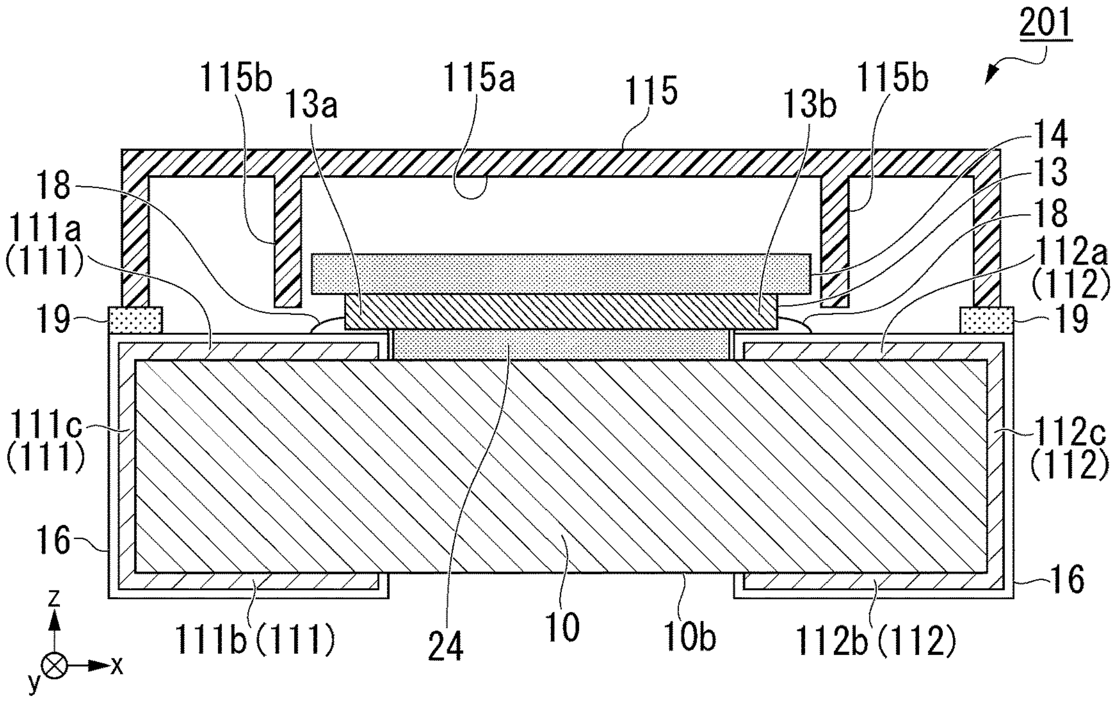
FIG. 10 is a schematic cross-sectional view of the protection element according to a sixth embodiment.

FIG. 10 is a schematic cross-sectional view of a protection element according to a sixth embodiment.

Members with the same reference sign as in the above-described embodiments have the same configuration and will not be described again. In addition, there will be cases where members with a different reference sign but having the same function as in the above-described embodiments are not described again.

Compared with the protection element 200 shown in FIG. 8, a protection element 201 shown in FIG. 10 is mainly different in terms of the fact that an insulating inorganic fibrous material 24 is provided on a side of the fuse element 13 opposite to the side on which the insulating inorganic fibrous material 14 is disposed, that is, the insulating inorganic fibrous material 24 is provided so as to sandwich the fuse element 13 together with the insulating inorganic fibrous material 14.

An insulating inorganic porous material may be used instead of the insulating inorganic fibrous material. For example, an insulating inorganic porous material may be used instead of either the insulating inorganic fibrous material 14 or the insulating inorganic fibrous material 24, and insulating inorganic porous materials may be used instead of the insulating inorganic fibrous material 14 and the insulating inorganic fibrous material 24.

Seventh Embodiment

Figure 11:
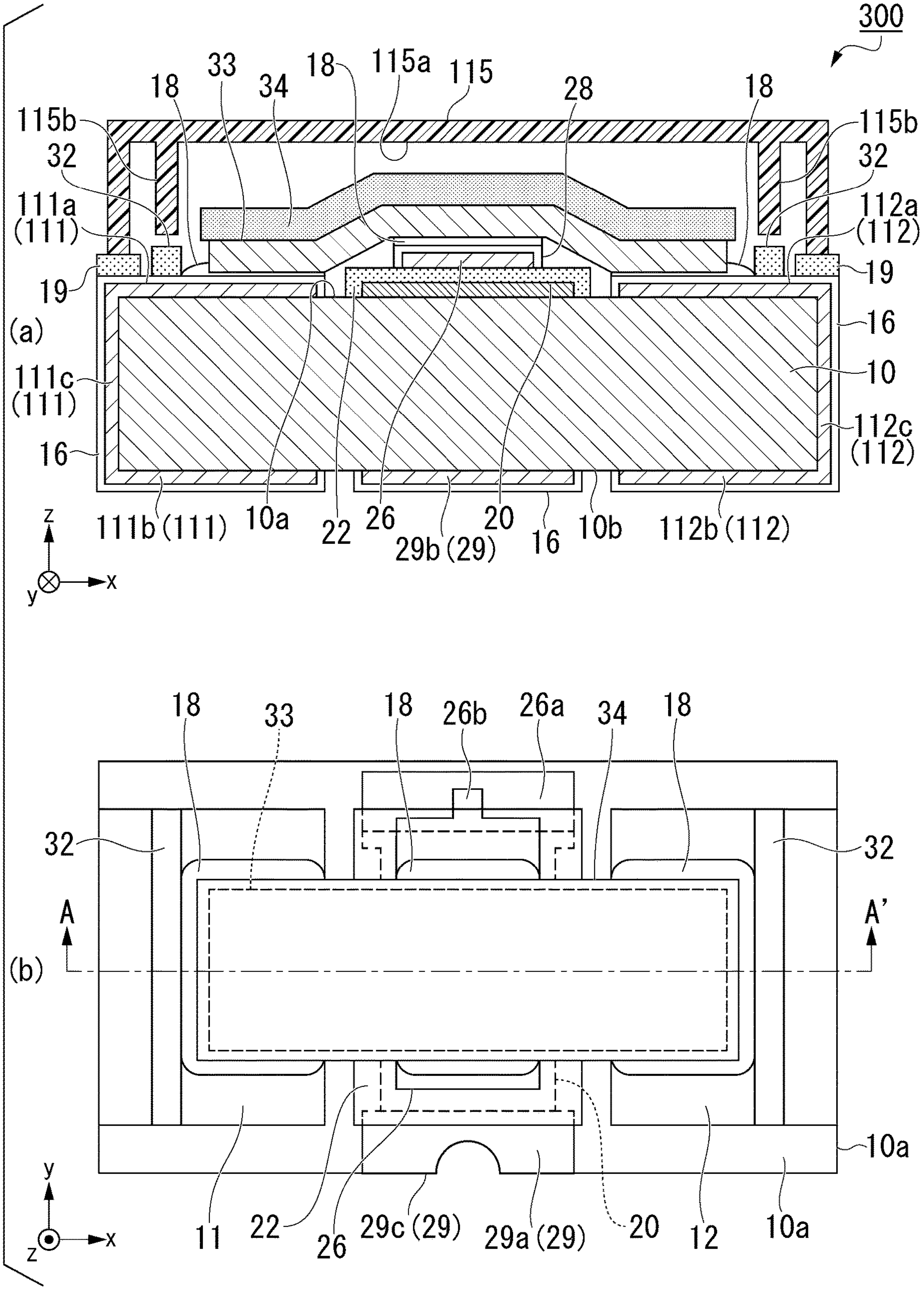
FIG. 11 shows schematic views of a protection element according to a seventh embodiment, wherein FIG. 11(*a*) is a schematic cross-sectional view and FIG. 11(*b*) is a schematic plan view of a state where a case member is removed.

FIG. 11 shows schematic views of a main portion of a protection element according to a seventh embodiment, wherein FIG. 11(*a*) is a schematic cross-sectional view and FIG. 11(*b*) is a schematic plan view of the protection element according to the seventh embodiment from which a case member is removed.

Members with the same reference sign as in the above-described embodiments have the same configuration and will not be described again. In addition, there will be cases where members with a different reference sign but having the same function as in the above-described embodiments are not described again.

A protection element 300 shown in FIG. 11 has the insulating substrate 10, the two electrodes 111 and 112 disposed apart from each other on the insulating substrate 10, a fuse element 33, an insulating inorganic fibrous material 34, a heat generating body 20 disposed on the insulating substrate 10, a heat generating body electrode 29 connected to a first end of the heat generating body 20, and a heat generating body extraction electrode 26 connected to a second end of the heat generating body 20 and the fuse element 33, the fuse element 33 is connected to the two electrodes 111 and 112, and the insulating heat removal member 34 is disposed in contact with or close to at least a part of a side of the fuse element 33 that does not face the insulating substrate 10.

An insulating inorganic porous material may be used instead of the insulating inorganic fibrous material.

<Heat Generating Body>

The heat generating body 20 is a conductive member that generates heat when a current is conducted and is made of, for example, nichrome, W, Mo, Ru, or the like, or a material containing these. The heat generating body 20 can be formed by forming a pattern of a paste obtained by mixing a powder of an alloy, composition, or compound of the above-described materials with a resin binder or the like on the insulating substrate 10 using a screen printing technique and sintering or the like the pattern.

The heat generating body 20 is covered with an insulating member 22, and the heat generating body extraction electrode 26 is formed so as to face the heat generating body 20 through the insulating member 22. The heat generating body extraction electrode 26 has a lower layer portion 26*a* that is formed on the front surface 10*a* of the insulating substrate 10 and is connected to the heat generating body 20 and an upper layer portion 26*b* that is laminated on the insulating member 22 to face the heat generating body 20 and connected to the fuse element 33. Therefore, the heat generating body 20 is electrically connected to the fuse element 33 through the heat generating body extraction electrode 26.

The heat generating body electrode 29 is formed of a heat generating body front surface electrode 29*a* formed on the front surface 10*a* of the insulating substrate 10, a heat generating body back surface electrode 29*b* formed on the back surface 10*b* of the insulating substrate 10, and a castellation 29*c* that connects the heat generating body front surface electrode 29*a* and the heat generating body back surface electrode 29*b*.

The heat generating body 20 is connected to the heat generating body extraction electrode 26 at one end and connected to the heat generating body electrode 29 at the other end.

<Fuse Element>

In addition, in the protection element 300, the fuse element 33 is connected to the heat generating body extraction electrode 26, thereby configuring a part of a conduction path to the heat generating body 20. Therefore, in the protection element 300, when the fuse element 33 is melted and the connection with an external circuit is cut off, the conduction path to the heat generating body 20 is also cut off, and thus it is possible to stop the generation of heat.

The fuse element 33 includes a high-melting point metal layer, whereby the fuse element 33 has improved resistance to high-temperature environments and thus has excellent capability for mounting and can be mounted on the first electrode 111, the second electrode 112, and the heat generating body extraction electrode 26 through the connecting materials 18 and then easily connected by reflow soldering or the like.

<Insulating Inorganic Fibrous Material>

As the insulating inorganic fibrous material 34, the same insulating inorganic fibrous material as described above can be used.

Figure 12:
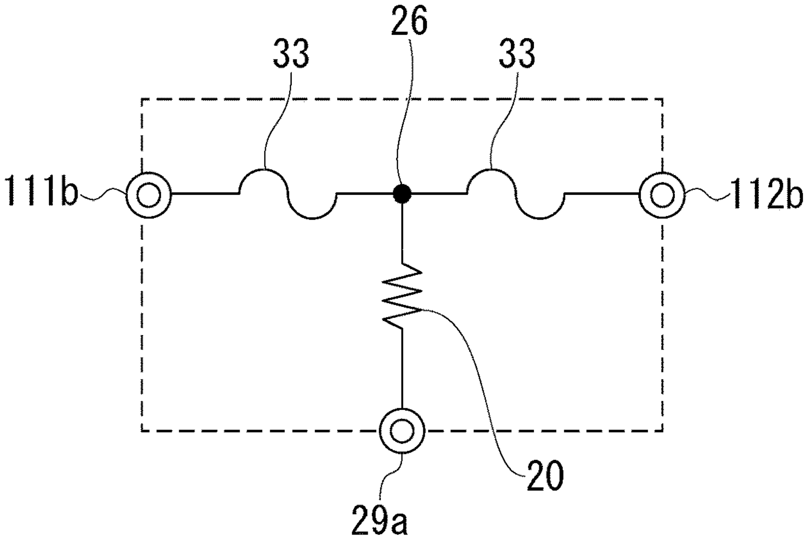
FIG. 12 is a circuit diagram before a fuse element in the protection element according to the seventh embodiment is fused.

The protection element 300 shown in FIG. 11 has a circuit configuration shown in FIG. 12. The protection element 300 is a circuit configuration formed of the fuse element 33 connected in series between the first back surface electrode 111*b* and the second back surface electrode 112*b* through the heat generating body extraction electrode 26 and the heat generating body 20 connected to the heat generating body electrode 29 at one end. The heat generating body 20 is electrically conducted through the heat generating body extraction electrode 26, which serves as a connection point to the fuse element 33, and caused to generate heat to melt the fuse element 33. The protection element 300 is connected to an external circuit board through the first back surface electrode 111*b*, the second back surface electrode 112*b*, and the heat generating body back surface electrode 29*b*, whereby the fuse element 33 is connected in series onto a current path of an external circuit through the first and second electrodes 111 and 112, and the heat generating body 20 is connected to a current control element provided in the external circuit through the heat generating body electrode 29.

In the protection element 300 including such a circuit configuration, in a case where there is a need to cut off the current path of the external circuit, the heat generating body 20 is electrically conducted with the current control element provided in the external circuit. In the protection element 300, the fuse element 33 incorporated onto the current path of the external circuit is melted by heat generated from the heat generating body 20, and the molten conductor of the fuse element 33 is pulled toward the heat generating body extraction electrode 26 and the first and second electrodes 111 and 112, whereby the fuse element 33 is fused. Therefore, the current path of the external circuit is cut off, and the fuse element 33 is fused, whereby the supply of power to the heat generating body 20 is also stopped.

In the protection element 300, in a case where the fuse element 33 is a laminate of a low-melting point metal layer and a high-melting point metal layer, since the low-melting point metal layer having a lower melting point than the high-melting point metal layer is laminated in the fuse element 33, the low-melting point metal layer melted by heat self-generated by the overcurrent begins to dissolve the high-melting point metal layer. Therefore, in the protection element 300, the high-melting point metal layer can be melted at a temperature lower than its melting point using the high-melting point metal layer dissolution action of the low-melting point metal layer of the fuse element 33 and can be rapidly fused.

<Manufacturing Method>

An example of a part of mounting the fuse element on the insulating substrate in the method for manufacturing the protection element 300 will be described.

The connecting materials 18 such as solder pastes are applied onto the first electrode 111, the second electrode 112, and the heat generating body extraction electrode 26 on the front surface 10*a* side of the insulating substrate 10, and the fuse element 33 is connected to the first electrode 111, the second electrode 112, and the heat generating body extraction electrode 26. Therefore, the fuse element 33 is mounted on the first electrode 111, the second electrode 112, and the heat generating body extraction electrode 26. Next, the insulating inorganic fibrous material 34 is placed on the fuse element 33.

Next, an adhesive 19 is applied to the front surface 10*a* side of the insulating substrate 10 in a predetermined range, and then the case member 115 is attached thereto, whereby the fuse element 33 is covered, and the protection element 300 is completed.

Eighth Embodiment

Figure 13:
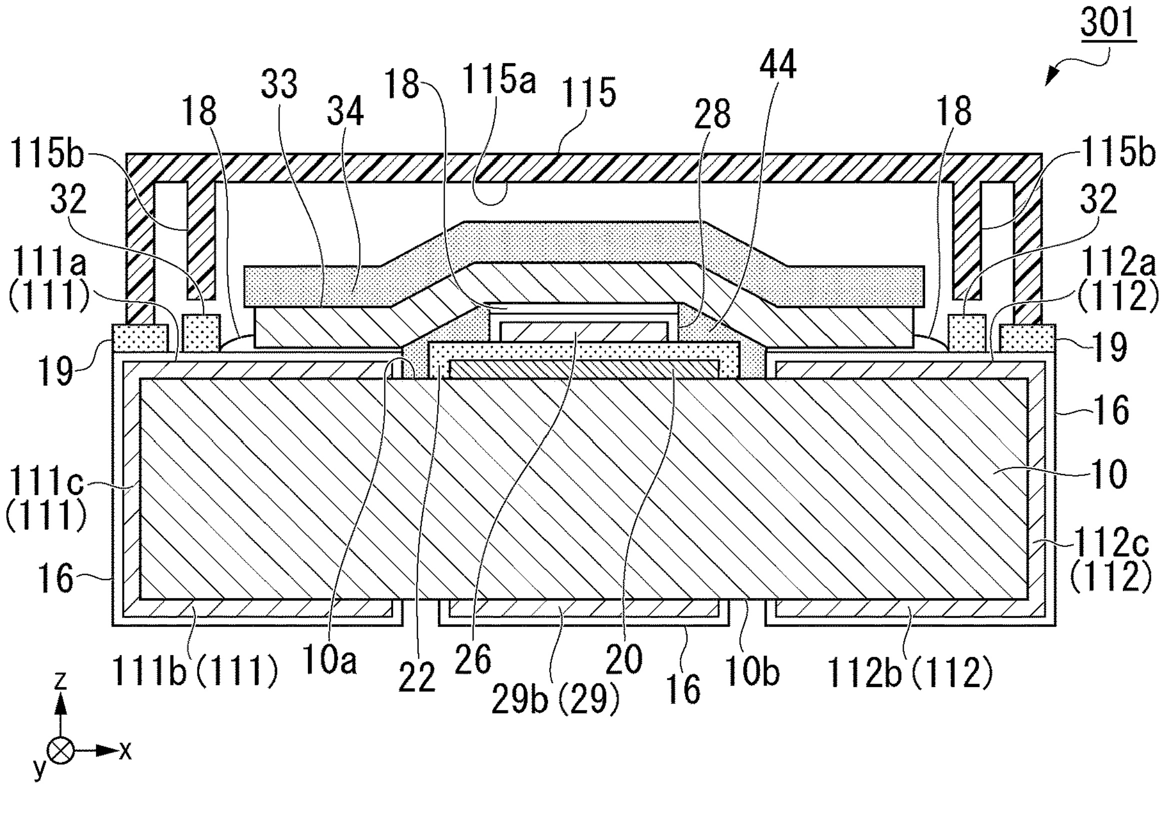
FIG. 13 is a schematic cross-sectional view of the protection element according to an eighth embodiment.

FIG. 13 is a schematic cross-sectional view of a protection element according to an eighth embodiment.

Members with the same reference sign as in the above-described embodiments have the same configuration and will not be described again. In addition, there will be cases where members with a different reference sign but having the same function as in the above-described embodiments are not described again.

Compared with the protection element 300 shown in FIG. 11, a protection element 301 shown in FIG. 13 is mainly different in terms of the fact that an insulating inorganic fibrous material 44 is provided on a side of the fuse element 33 opposite to the side on which the insulating inorganic fibrous material 34 is disposed.

An insulating inorganic porous material may be used instead of the insulating inorganic fibrous material. For example, an insulating inorganic porous material may be used instead of either the insulating inorganic fibrous material 34 or the insulating inorganic fibrous material 44, and insulating inorganic porous materials may be used instead of the insulating inorganic fibrous material 34 and the insulating inorganic fibrous material 44.

EXAMPLES

Example 1

A protection element having a structure in which both surfaces of a fuse element were sandwiched by insulating inorganic fibrous materials was produced based on the type shown in FIG. 4 using a laminate-type fuse element shown in FIG. 3 (*a*) (the inner layer was made of a Sn alloy that was 5.4 mm in width, 11 mm in length, and 0.3 mm in thickness, and the outer layer was made of 6 μm-thick Ag), ceramic fiber paper (manufactured by Sakaguchi E. H. VOC Corp.) as an insulating inorganic fibrous material, and a resin case member as a case member.

Comparative Example 1

A protection element was produced in the same manner as in Example 1 except that the ceramic fiber paper was not used.

Comparative Example 2

A protection element was produced in the same manner as in Example 1 except that the ceramic fiber paper was not used and the case member was filled with an arc-extinguishing agent.

(Current Cutoff Test 1)

A current cutoff test was performed at 100 V and 295 A.

In the protection element of Example 1, the current was cut off in 0.3 seconds, and the case member was not particularly affected.

In the protection element of Comparative Example 1, the current was cut off in 0.3 seconds, and the case member was scattered.

In the protection element of Comparative Example 2, the current was cut off in 0.5 seconds, and an upper case member of the case member was removed with a sound.

Example 2

A protection element in the type shown in FIG. 6 was produced using a laminate-type fuse element shown in FIG. 3 (*a*) (the inner layer was made of a Sn alloy that was 1.0 mm in width, 11 mm in length, and 0.2 mm in thickness, and the outer layer was made of 4 μm-thick Ag), ceramic fiber paper (manufactured by Sakaguchi E. H. VOC Corp.) as an insulating inorganic fibrous material, and a resin case member as a case member.

Comparative Example 3

A protection element was produced in the same manner as in Example 2 except that the ceramic fiber paper was not used.

Comparative Example 4

A protection element was produced in the same manner as in Example 2 except that the ceramic fiber paper was not used and the case member was filled with an arc-extinguishing agent.

(Current Cutoff Test 2)

A current cutoff test was performed at 120 V and 200 A.

In the protection element of Example 2, the current was cut off in 0.7 seconds, and the case member was not particularly affected.

In the protection element of Comparative Example 3, the current was cut off in 0.4 seconds, and the case member was not particularly affected.

In the protection element of Comparative Example 4, the current was cut off in 0.9 seconds, a hole was opened in the case member, and the case member was burned with an explosion sound.

(Current Cutoff Test 3)

A current cutoff test was performed at 140 V and 200 A.

In the protection element of Example 2, the current was cut off in 0.7 seconds, and the case member was not particularly affected.

In the protection element of Comparative Example 3, the current was cut off in 0.5 seconds, and the case member was scattered.

(Current Cutoff Test 4)

A current cutoff test was performed at 150 V and 190 A.

In the protection element of Example 2, the current was cut off in 0.9 seconds, and the case member was not particularly affected.

REFERENCE SIGNS LIST

1: First terminal member (terminal member)
2: Second terminal member (terminal member)
3, 13, 23, 33: Fuse element
4, 14, 24, 34, 44: Insulating inorganic fibrous material (insulating inorganic porous material)
5, 15, 25, 115: Case member
10: Insulating substrate
20: Heat generating body
26: Heat generating body extraction electrode
29: Heat generating body electrode
100, 101, 102, 103, 200, 201, 300, 301: Protection element
111: First electrode
112: Second electrode

What is claimed is:

1. A protection element comprising:

a fuse element including a plurality of fuse element groups that are disposed in different tiers;

a plurality of insulating inorganic fibrous materials that are not impregnated with an insulating paste and are arranged to be overlapped; and a case member configured to cover at least a part of the fuse element and the plurality of insulating inorganic fibrous materials, wherein each of the plurality of insulating inorganic fibrous materials has a space in which a molten scattered material from the fuse element is scattered at a time of arc discharge, wherein each of the plurality of fuse element groups is formed of a plurality of fuse element parts which are arranged in parallel on a same surface, wherein each of the plurality of insulating inorganic fibrous materials is a ceramic paper or a ceramic fiber paper that has a sheet shape which is arranged in parallel with the plurality of fuse element groups, wherein each of the plurality of fuse element parts is a laminate of a low-melting point metal layer and a high-melting point metal layer, wherein the high-melting point metal layer is made of silver (Ag) or a metal containing Ag as a main component, wherein the low-melting point metal layer is a layer having a lower melting point than the high-melting point metal layer, and wherein each of the plurality of fuse element groups is sandwiched by two of the plurality of insulating fibrous materials from opposing sides in a thickness direction.

2. The protection element according to claim 1, wherein the plurality of insulating inorganic fibrous materials are made of ceramic.

3. The protection element according to claim 1, wherein each of the plurality of the fuse element parts has a rod shape or a wire shape.

4. The protection element according to claim 1, wherein each of the fuse element parts in the plurality of fuse element parts is the laminate of the low-melting point metal layer as an inner layer and the high-melting point metal layer as an outer layer.

5. The protection element according to claim 1, wherein the low-melting point metal is made of tin (Sn) or a metal containing Sn as a main component.

6. The protection element according to claim 1, wherein a film thickness of the low-melting point metal layer is 30 μm or more, and a film thickness of the high-melting point metal layer is 1 μm or more.

7. The protection element according to claim 1, further comprising:

terminal members each at both end portions of the fuse element in a conduction direction, and wherein the fuse element and the plurality of insulating inorganic fibrous materials are enclosed in the case member such that the terminal members are partially exposed.

8. The protection element according to claim 1, wherein the case member is plastic.

9. The protection element according to claim 8, wherein the case member is nylon-based plastic.

10. The protection element according to claim 1, wherein a number of the fuse element parts constituting each of the plurality of fuse element groups is four.

* * * * *